US008111226B2

(12) United States Patent
Tsai et al.

(10) Patent No.: US 8,111,226 B2
(45) Date of Patent: Feb. 7, 2012

(54) LIQUID CRYSTAL DISPLAY DEVICE

(75) Inventors: Yi-Cheng Tsai, Taoyuan County (TW); Kuei-Wei Huang, Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 503 days.

(21) Appl. No.: 12/465,641

(22) Filed: May 13, 2009

(65) Prior Publication Data

US 2010/0231494 A1 Sep. 16, 2010

(30) Foreign Application Priority Data

Mar. 16, 2009 (TW) ................................ 98204043 U

(51) Int. Cl.
*G02F 1/133* (2006.01)
*G09G 3/36* (2006.01)

(52) U.S. Cl. .............. 345/90; 345/92; 345/94; 345/204; 349/48; 349/139; 349/144

(58) Field of Classification Search ............ 345/87–104, 345/204; 349/48, 129, 144, 139
See application file for complete search history.

(56) References Cited

U.S. PATENT DOCUMENTS

| | | | | |
|---|---|---|---|---|
| 2005/0036091 | A1 | 2/2005 | Song | |
| 2007/0018927 | A1 | 1/2007 | Kim | |
| 2009/0122214 | A1 * | 5/2009 | Yoon et al. | 349/48 |
| 2009/0135323 | A1 * | 5/2009 | Yang et al. | 349/37 |

* cited by examiner

*Primary Examiner* — Lun-Yi Lao
*Assistant Examiner* — MD Saiful A Siddiqui
(74) *Attorney, Agent, or Firm* — Winston Hsu; Scott Margo

(57) ABSTRACT

A multi-domain vertical alignment liquid crystal display device includes a data line, a first gate line, a second gate line, a first sub-pixel unit, and a second sub-pixel unit. The first sub-pixel unit includes a first switch, a first liquid-crystal capacitor and a first storage capacitor. The first switch functions to control writing the data signal of the data line into the first liquid-crystal and storage capacitors based on the first gate signal of the first gate line. The second sub-pixel unit includes a second switch, a second liquid-crystal capacitor, an auxiliary switch, a second storage capacitor and a third storage capacitor. The second and auxiliary switches are employed to control writing the data signal into the second liquid-crystal capacitor, the second storage capacitor and the third storage capacitor based on the first gate signal and the second gate signal of the second gate line respectively.

13 Claims, 11 Drawing Sheets

LIQUID CRYSTAL DISPLAY DEVICE

BACKGROUND OF THE INVENTION

1. Field of the Invention

The present invention relates to a liquid crystal display device, and more particularly, to a multi-domain vertical alignment (MVA) liquid crystal display device.

2. Description of the Prior Art

Because the liquid crystal display (LCD) device has advantages of thin appearance, low power consumption, and low radiation, the LCD device has been widely applied in various electronic products such as computer monitors, mobile phones, personal digital assistants (PDAs), and flat panel televisions, etc. In general, the LCD device comprises a liquid crystal layer encapsulated by two substrates. The operation of an LCD device is featured by varying voltage drops between opposite sides of the liquid crystal layer for twisting the angles of the liquid crystal molecules in the liquid crystal layer so that the transmittance of the liquid crystal layer can be controlled for illustrating images with the aid of the light source provided by a backlight module.

However, the viewing angle of a conventional LCD device is not sufficiently wide to ensure high display quality, therefore limiting the development of LCDs. For that reason, a multi-domain vertical alignment (MVA) LCD device is made to increase the viewing angle. A 4-domain vertical alignment LCD device was initially developed for achieving a wide viewing angle image display. In the structure of the 4-domain vertical alignment LCD device, each pixel unit has only one sub-pixel unit, which results in a color washout phenomenon occurring to an oblique viewing angle of the 4-domain vertical alignment LCD device. For that reason, an 8-domain vertical alignment LCD device is developed for solving the color washout problem. In the structure of the 8-domain vertical alignment LCD device, each pixel unit includes two sub-pixel units for achieving a feature of wide viewing angle without an occurrence of the color washout phenomenon. That is, based on gray level averaging effect of two gamma curves corresponding to the two sub-pixel units, optimal visual experience can be realized in different viewing angles, for achieving a high-quality wide viewing angle image display.

FIG. 1 is a circuit diagram schematically showing a prior MVA liquid crystal display device. As shown in FIG. 1, the liquid crystal display device 100 comprises a pixel unit 180, a data line Dn, a data line Dn+1, a gate line Gma, a gate line Gmb, and a storage capacitor line (also termed as a common line) 190. The pixel unit 180 comprises a first sub-pixel unit 110 and a second sub-pixel unit 120. The first sub-pixel unit 110 includes a thin film transistor (TFT) 115, a liquid crystal capacitor Clca, and a storage capacitor Csta. The second sub-pixel unit 120 includes a thin film transistor 125, a liquid crystal capacitor Clcb, and a storage capacitor Cstb. The thin film transistor 115 is electrically connected to the data line Dn and the gate line Gma. The thin film transistor 125 is electrically connected to the data line Dn and the gate line Gmb. Although the LCD device 100 is able to achieve an MVA wide viewing angle image display by controlling the transmittances of the first sub-pixel unit 110 and the second sub-pixel unit 120 through making use of the date signals delivered by the data line Dn, the pixel unit 180 requires two gate lines Gma and Gmb for providing two gate signals so as to control two thin film transistor 115 and 125. That is, the number of gate lines required by the LCD device 100 is twice the number of gate lines required by a conventional LCD device, and therefore the aperture ratio of each pixel unit in the LCD device 100 is significantly reduced. Furthermore, the frequency of driving clock used in the LCD device 100 is also twice the frequency of driving clock used in a conventional LCD device. For that reason, compared with a conventional LCD device, the LCD device 100 is rather costly, and the operation power consumption is increased significantly.

There is another prior-art MVA liquid crystal display device having each pixel unit electrically connected to just one gate line. However, regarding this prior-art MVA liquid crystal display device, one of two sub-pixel units in each pixel unit has a floating electrode, and therefore a phenomenon of static charge accumulation is likely to occur during a long-term operation, which in turn causes an occurrence of permanent image sticking effect and the image display quality is then degraded significantly.

SUMMARY OF THE INVENTION

In accordance with an embodiment of the present invention, a liquid crystal display device capable of achieving an MVA wide viewing angle image display based on simplified structure is provided. The liquid crystal display device comprises a data line, a first gate line, a second gate line, a first sub-pixel unit, and a second sub-pixel unit. The data line is employed to deliver a data signal. The first gate line is employed to deliver a first gate signal. The second gate line is employed to deliver a second gate signal. The first sub-pixel unit comprises a first data switch, a first liquid crystal capacitor, and a first storage capacitor. The first data switch comprises a first end electrically connected to the data line for receiving the data signal, a gate end electrically connected to the first gate line for receiving the first gate signal, and a second end. The first liquid crystal capacitor comprises a first end electrically connected to the second end of the first data switch and a second end for receiving a first common voltage. The first storage capacitor comprises a first end electrically connected to the second end of the first data switch and a second end for receiving a second common voltage. The second sub-pixel unit comprises a second data switch, a second liquid crystal capacitor, an auxiliary switch, a second storage capacitor, and a third storage capacitor. The second data switch comprises a first end electrically connected to the data line for receiving the data signal, a gate end electrically connected to the first gate line for receiving the first gate signal, and a second end. The second liquid crystal capacitor comprises a first end electrically connected to the second end of the second data switch and a second end for receiving the first common voltage. The auxiliary switch comprises a first end electrically connected to the second end of the second data switch, a gate end electrically connected to the second gate line for receiving the second gate signal, and a second end. The second storage capacitor comprises a first end electrically connected to the second end of the auxiliary switch and a second end for receiving the second common voltage. The third storage capacitor comprises a first end electrically connected to the second end of the second data switch and a second end electrically connected to the second end of the auxiliary switch.

In accordance with another embodiment of the present invention, a liquid crystal display device capable of achieving an MVA wide viewing angle image display based on simplified structure is provided. The liquid crystal display device comprises a data line, a first gate line, a second gate line, a first sub-pixel unit, and a second sub-pixel unit. The data line is employed to deliver a data signal. The first gate line is employed to deliver a first gate signal. The second gate line is employed to deliver a second gate signal. The first sub-pixel unit comprises a first data switch, a first liquid crystal capacitor, and a first storage capacitor. The first data switch comprises a first end electrically connected to the data line for receiving the data signal, a gate end electrically connected to the first gate line for receiving the first gate signal, and a second end. The first liquid crystal capacitor comprises a first end electrically connected to the second end of the first data switch and a second end for receiving a first common voltage. The first storage capacitor comprises a first end electrically connected to the second end of the first data switch and a second end for receiving a second common voltage. The second sub-pixel unit comprises a second data switch, a second liquid crystal capacitor, an auxiliary switch, a second storage capacitor, a third storage capacitor, and a fourth storage capacitor. The second data switch comprises a first end electrically connected to the data line for receiving the data signal, a gate end electrically connected to the first gate line for receiving the first gate signal, and a second end. The second liquid crystal capacitor comprises a first end electrically connected to the second end of the second data switch and a second end for receiving the first common voltage. The auxiliary switch comprises a first end for receiving the second common voltage, a gate end electrically connected to the second gate line for receiving the second gate signal, and a second end. The second storage capacitor comprises a first end electrically connected to the second end of the auxiliary switch and a second end for receiving the second common voltage. The third storage capacitor comprises a first end electrically connected to the second end of the second data switch and a second end electrically connected to the second end of the auxiliary switch. The fourth storage capacitor comprises a first end electrically connected to the second end of the second data switch and a second end for receiving the second common voltage.

In accordance with another embodiment of the present invention, a liquid crystal display device capable of achieving an MVA wide viewing angle image display based on simplified structure is provided. The liquid crystal display device comprises a data line, a first gate line, a second gate line, a first sub-pixel unit, and a second sub-pixel unit. The data line is employed to deliver a data signal. The first gate line is employed to deliver a first gate signal. The second gate line is employed to deliver a second gate signal. The first sub-pixel unit comprises a first data switch, a first liquid crystal capacitor, and a first storage capacitor. The first data switch comprises a first end electrically connected to the data line for receiving the data signal, a gate end electrically connected to the first gate line for receiving the first gate signal, and a second end. The first liquid crystal capacitor comprises a first end electrically connected to the second end of the first data switch and a second end for receiving a first common voltage. The first storage capacitor comprises a first end electrically connected to the second end of the first data switch and a second end for receiving a second common voltage. The second sub-pixel unit comprises a second data switch, a second liquid crystal capacitor, a second storage capacitor, an auxiliary switch, and a third storage capacitor. The second data switch comprises a first end electrically connected to the data line for receiving the data signal, a gate end electrically connected to the first gate line for receiving the first gate signal, and a second end. The second liquid crystal capacitor comprises a first end electrically connected to the second end of the second data switch and a second end for receiving the first common voltage. The second storage capacitor comprises a first end electrically connected to the second end of the second data switch and a second end for receiving the second common voltage. The auxiliary switch comprises a first end electrically connected to the second end of the second data switch, a gate end electrically connected to the second gate line for receiving the second gate signal, and a second end. The third storage capacitor comprises a first end electrically connected to the second end of the auxiliary switch and a second end for receiving the second common voltage.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
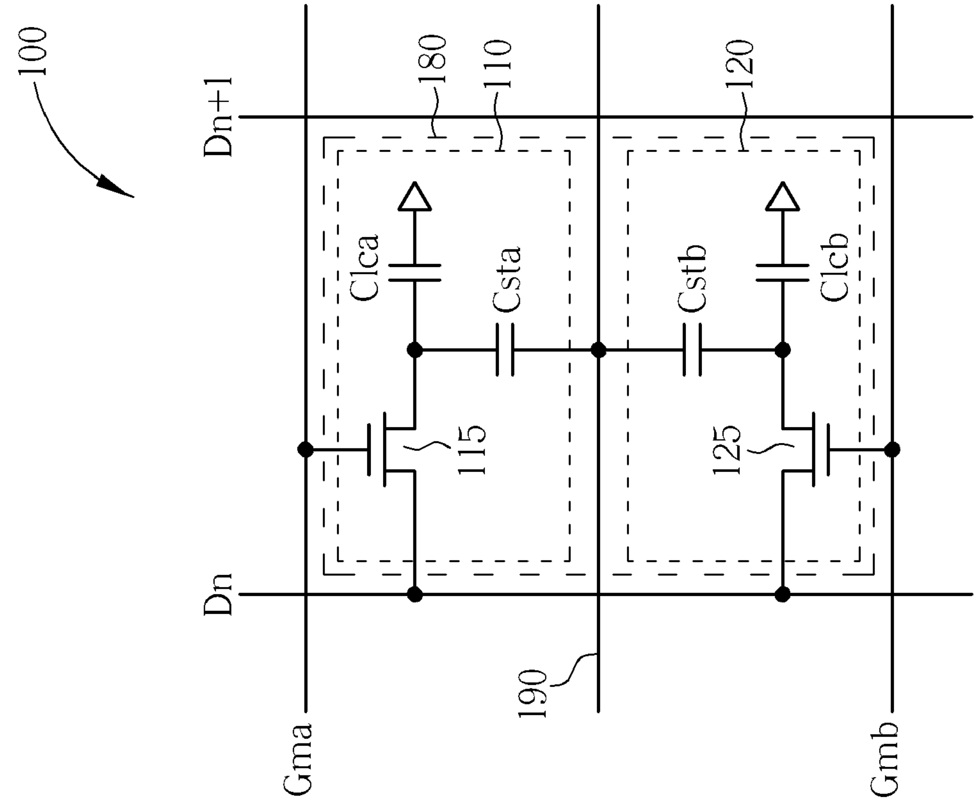
FIG. 1 PRIOR ART
FIG. 1 is a circuit diagram schematically showing a prior MVA liquid crystal display device.
Figure 2:
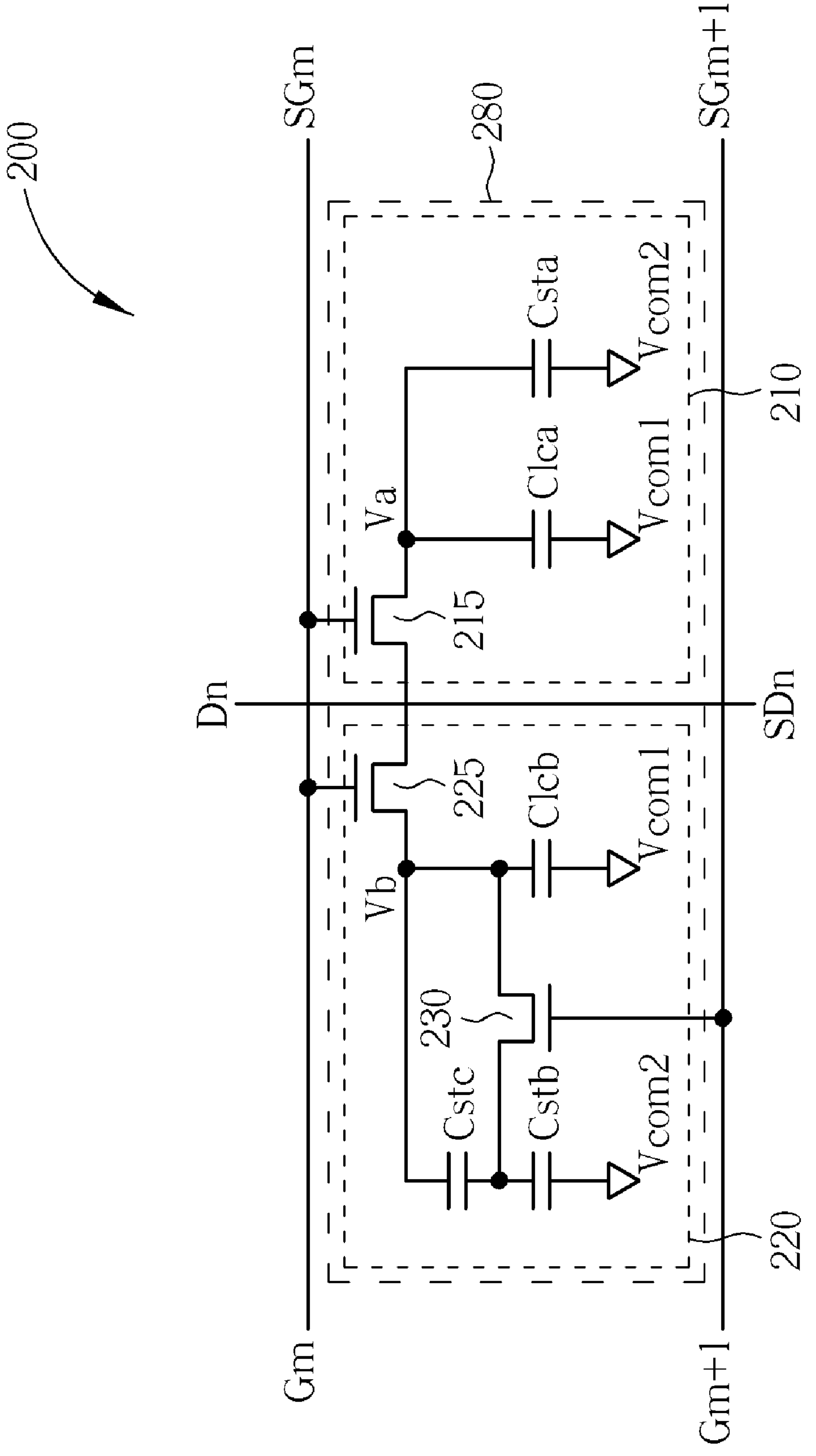
FIG. 2 is a circuit diagram schematically showing an MVA liquid crystal display device in accordance with a first embodiment of the present invention.

FIG. 2 is a circuit diagram schematically showing an MVA liquid crystal display device in accordance with a first embodiment of the present invention. As shown in FIG. 2, the LCD device 200 comprises a pixel unit 280, a data line Dn, a gate line Gm, and a gate line Gm+1. The gate line Gm+1 is adjacent to the gate line Gm. The pixel unit 280 comprises a first sub-pixel unit 210 and a second sub-pixel unit 220. The first sub-pixel unit 210 includes a data switch 215, a liquid crystal capacitor Clca, and a storage capacitor Csta. The second sub-pixel unit 220 includes a data switch 225, an auxiliary switch 230, a liquid crystal capacitor Clcb, a storage capacitor Cstb, and a storage capacitor Cstc. The data switches 215, 225 and the auxiliary switch 230 are thin film transistors or metal oxide semiconductor (MOS) field effect transistors.

The data switch 215 comprises a first end electrically connected to the data line Dn for receiving a data signal SDn, a gate end electrically connected to the gate line Gm for receiving a gate signal SGm, and a second end for outputting a first voltage Va. The liquid crystal capacitor Clca comprises a first end electrically connected to the second end of the data switch 215 and a second end for receiving a first common voltage Vcom1. The storage capacitor Csta comprises a first end electrically connected to the second end of the data switch 215 and a second end for receiving a second common voltage Vcom2. The capacitance of the liquid crystal capacitor Clca is identical to or different from the capacitance of the liquid crystal capacitor Clcb. The capacitances of the storage capacitors Csta, Cstb and Cstc are identical or different. The second common voltage Vcom2 is identical to or different from the first common voltage Vcom1.

The data switch 225 comprises a first end electrically connected to the data line Dn for receiving the data signal SDn, a gate end electrically connected to the gate line Gm for receiving the gate signal SGm, and a second end for outputting a second voltage Vb. The liquid crystal capacitor Clcb comprises a first end electrically connected to the second end of the data switch 225 and a second end for receiving the first common voltage Vcom1. The auxiliary switch 230 comprises a first end electrically connected to the second end of the data switch 225, a gate end electrically connected to the gate line Gm+1 for receiving a gate signal SGm+1, and a second end. The storage capacitor Cstb comprises a first end electrically connected to the second end of the auxiliary switch 230 and a second end for receiving the second common voltage Vcom2. The storage capacitor Cstc comprises a first end electrically connected to the second end of the data switch 225 and a second end electrically connected to the second end of the auxiliary switch 230.

Figure 3:
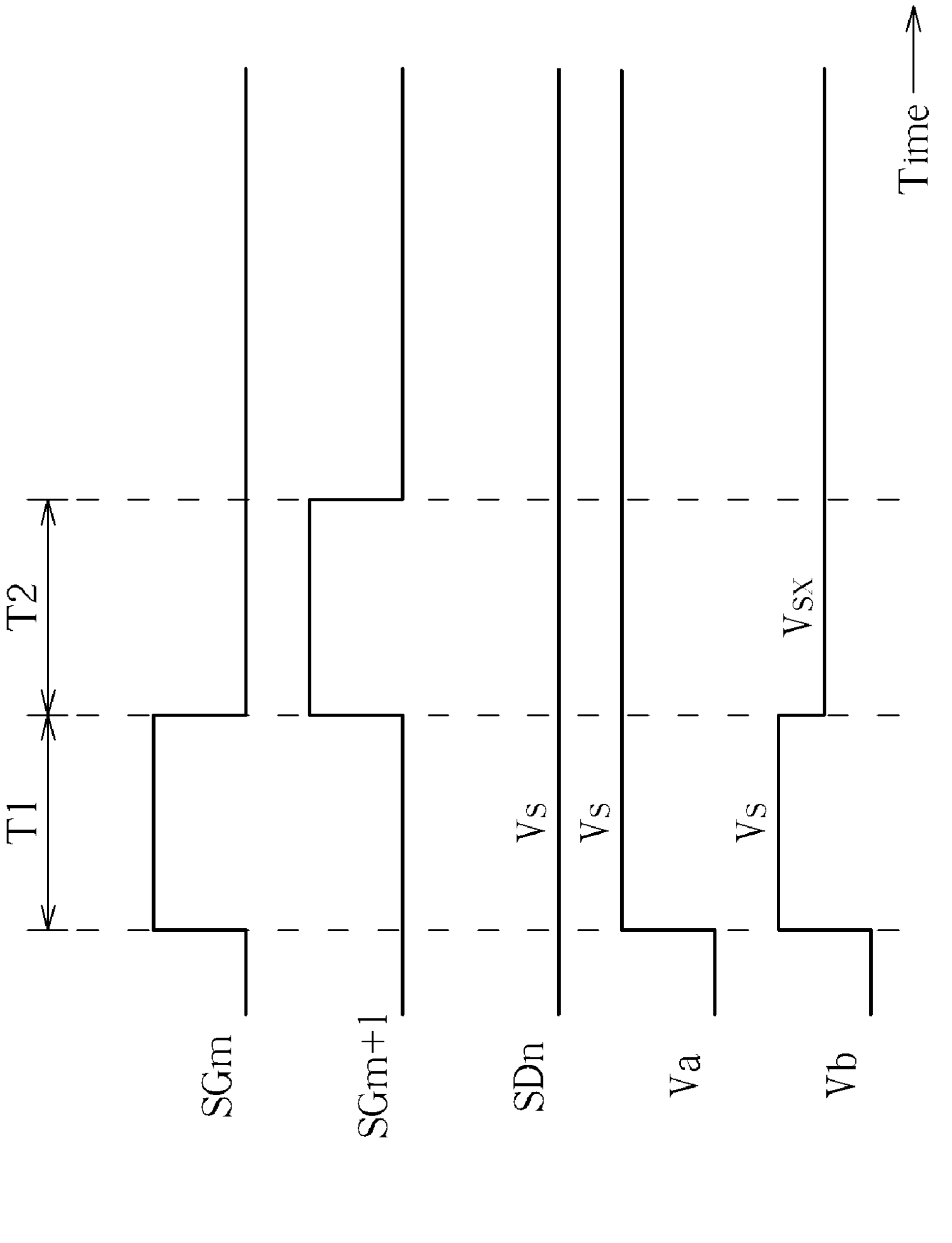
FIG. 3 shows related signal waveforms regarding operations of the LCD device in FIG. 2, having time along the abscissa.

FIG. 3 shows related signal waveforms regarding operations of the LCD device 200 in FIG. 2, having time along the abscissa. The signal waveforms in FIG. 3, from top to bottom, are the gate signal SGm, the gate signal SGm+1, the data signal SDn, the first voltage Va, and the second voltage Vb. The data signal SDn is assumed to retain a voltage Vs in a short time including intervals T1 and T2. As shown in FIG. 3, the gate signal SGm has high voltage level and the gate signal SGm+1 has low voltage level during the interval T1, therefore the data switches 215, 225 are turned on and the auxiliary switch 230 is turned off. Accordingly, both the first voltage Va and the second voltage Vb become the voltage Vs. In the meantime, the second end of the data switch 225 stores a charge amount Qb1 of an equivalent capacitor corresponding to the second sub-pixel unit 220. The charge amount Qb1 can be expressed as Formula (1) listed below.

$$Qb1 = \left[ Clcbv + \frac{Cstbv}{1 + \frac{Cstbv}{Cstcv}} \right] Vs \quad \text{Formula (1)}$$

In Formula (1), Clcbv, Cstbv, and Cstcv represent the capacitances of the liquid crystal capacitor Clcb and the storage capacitors Cstb, Cstc respectively. During the interval T2, the gate signal SGm is switching to low voltage level and the gate signal SGm+1 is switching to high voltage level, therefore the data switches 215, 225 are turned off and the auxiliary switch 230 is turned on. For that reason, the first voltage Va holds the voltage Vs; however, the second voltage Vb is switching to become a voltage Vsx following an occurrence of short-circuit between the first and second ends of the storage capacitor Cstc caused by turning on the auxiliary switch 230. The voltage Vsx can be deduced based on a conservation rule of the charge amount Qb1 and is expressed as Formula (2) listed below.

$$Vsx = \frac{\left[ Clcbv + \frac{Cstbv}{1 + \frac{Cstbv}{Cstcv}} \right]}{(Clcbv + Cstbv)} Vs = \alpha Vs \quad \text{Formula (2)}$$

In Formula (2), a is a predetermined proportional constant. After the interval T2, the first sub-pixel unit 210 and the second sub-pixel unit 220 are operative to achieve an MVA wide viewing angle image display based on the first voltage Va and the second voltage Vb having a predetermined proportional relationship. If the electrode areas of the capacitors in the pixel unit 280 are well adjusted, the image quality of the LCD device 200 can be optimized In summary, since the LCD device 200 of the present invention provides different subpixel voltages by making use of conventional driving feature corresponding to gate signals of two adjacent gate lines, the number of gate lines required by the LCD device 200 is substantially the same as the number of gate lines required by a conventional LCD device. Therefore, the aperture ratio of each pixel unit in the LCD device 200 is not reduced and the frequency of driving clock used in the LCD device 200 is the same as the frequency of driving clock used in the conventional LCD device. That is, the LCD device 200 is capable of achieving an MVA wide viewing angle image display based on a cost-effective simplified structure. In one embodiment, the LCD device 200 is employed to realize high image display quality having wide viewing angle based on 8-domain vertical alignment design. Besides, the LCD device 200 has no floating electrode and is able to maintain high image display quality during a long-term operation.

Figure 4:
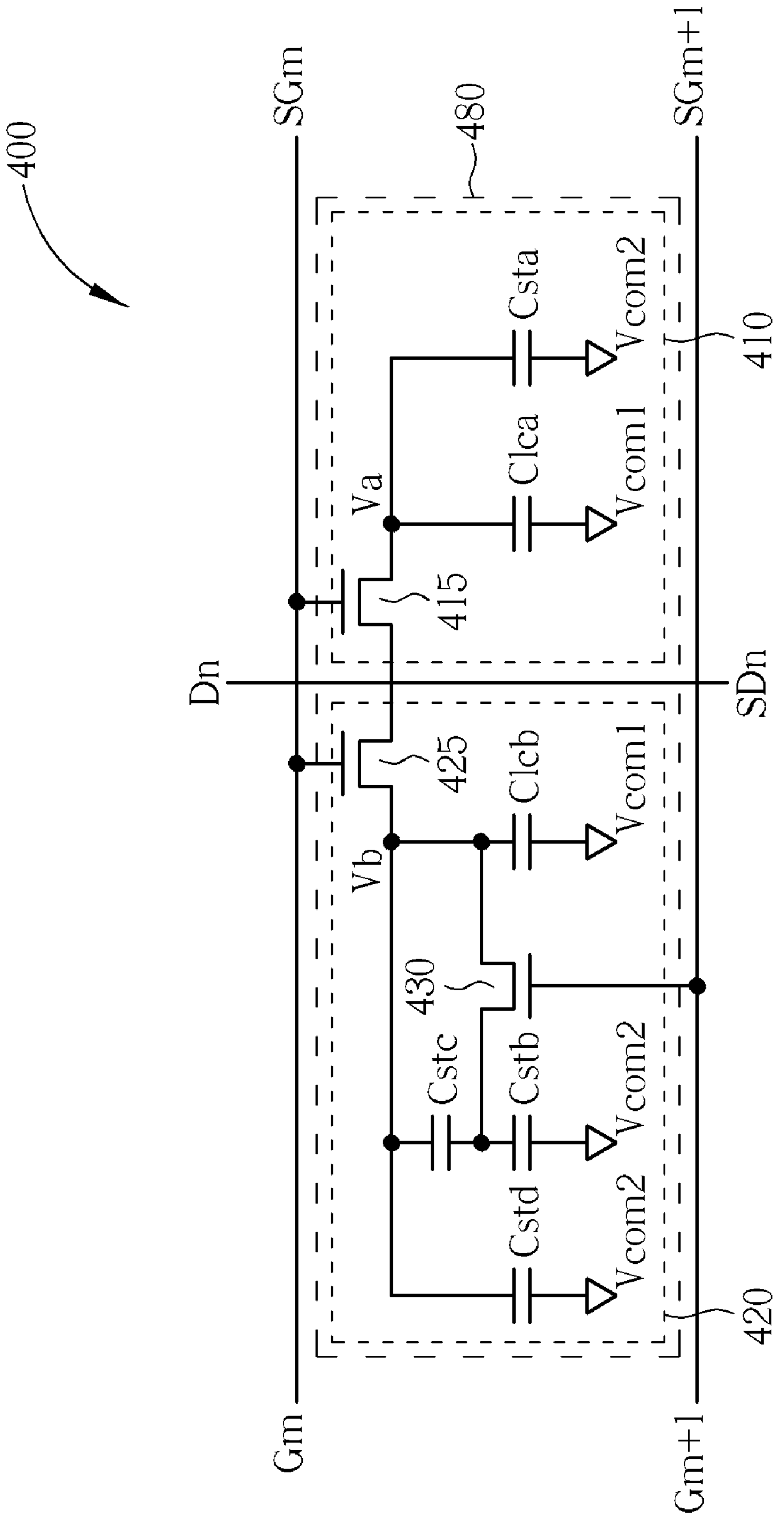
FIG. 4 is a circuit diagram schematically showing an MVA liquid crystal display device in accordance with a second embodiment of the present invention.

FIG. 4 is a circuit diagram schematically showing an MVA liquid crystal display device in accordance with a second embodiment of the present invention. As shown in FIG. 4, the LCD device 400 comprises a pixel unit 480, a data line Dn, a gate line Gm, and a gate line Gm+1. The gate line Gm+1 is adjacent to the gate line Gm. The pixel unit 480 comprises a first sub-pixel unit 410 and a second sub-pixel unit 420. The first sub-pixel unit 410 includes a data switch 415, a liquid crystal capacitor Clca, and a storage capacitor Csta. The second sub-pixel unit 420 includes a data switch 425, an auxiliary switch 430, a liquid crystal capacitor Clcb, a storage capacitor Cstb, a storage capacitor Cstc, and a storage capacitor Cstd. The data switches 415, 425 and the auxiliary switch 430 are thin film transistors or MOS field effect transistors.

The data switch 415 comprises a first end electrically connected to the data line Dn for receiving a data signal SDn, a gate end electrically connected to the gate line Gm for receiving a gate signal SGm, and a second end for outputting a first voltage Va. The liquid crystal capacitor Clca comprises a first end electrically connected to the second end of the data switch 415 and a second end for receiving a first common voltage Vcom1. The storage capacitor Csta comprises a first end electrically connected to the second end of the data switch 415 and a second end for receiving a second common voltage Vcom2. The capacitance of the liquid crystal capacitor Clca is identical to or different from the capacitance of the liquid crystal capacitor Clcb. The capacitances of the storage capacitors Csta, Cstb, Cstc and Cstd are identical or different. The second common voltage Vcom2 is identical to or different from the first common voltage Vcom1.

The data switch 425 comprises a first end electrically connected to the data line Dn for receiving the data signal SDn, a gate end electrically connected to the gate line Gm for receiving the gate signal SGm, and a second end for outputting a second voltage Vb. The liquid crystal capacitor Clcb comprises a first end electrically connected to the second end of the data switch 425 and a second end for receiving the first common voltage Vcom1. The auxiliary switch 430 comprises a first end electrically connected to the second end of the data switch 425, a gate end electrically connected to the gate line Gm+1 for receiving a gate signal SGm+1, and a second end. The storage capacitor Cstb comprises a first end electrically connected to the second end of the auxiliary switch 430 and a second end for receiving the second common voltage Vcom2. The storage capacitor Cstc comprises a first end electrically connected to the second end of the data switch 425 and a second end electrically connected to the second end of the auxiliary switch 430. The storage capacitor Cstd comprises a first end electrically connected to the second end of the data switch 425 and a second end for receiving the second common voltage Vcom2.

Figure 5:
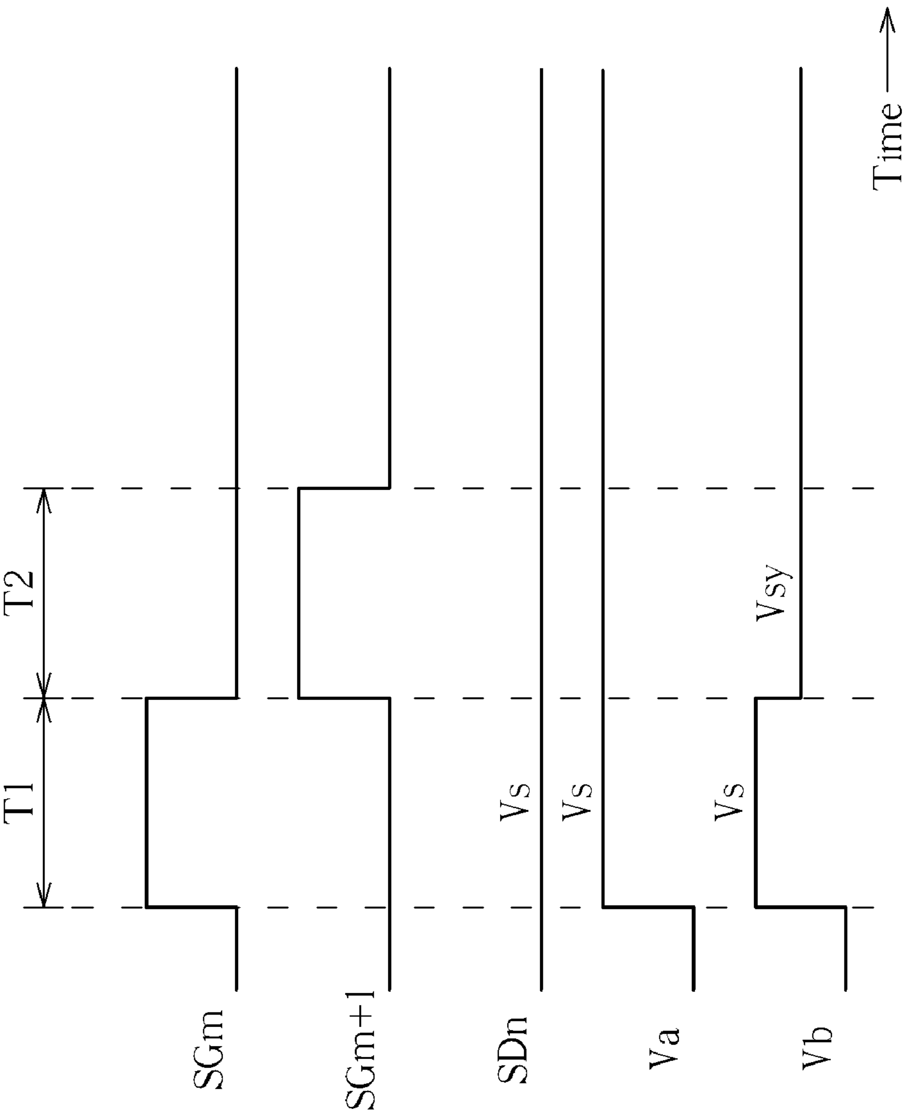
FIG. 5 shows related signal waveforms regarding operations of the LCD device in FIG. 4, having time along the abscissa.

FIG. 5 shows related signal waveforms regarding operations of the LCD device 400 in FIG. 4, having time along the abscissa. The signal waveforms in FIG. 5, from top to bottom, are the gate signal SGm, the gate signal SGm+1, the data signal SDn, the first voltage Va, and the second voltage Vb. The data signal SDn is assumed to retain a voltage Vs in a short time including intervals T1 and T2. As shown in FIG. 5, the gate signal SGm has high voltage level and the gate signal SGm+1 has low voltage level during the interval T1, therefore the data switches 415, 425 are turned on and the auxiliary switch 430 is turned off. Accordingly, both the first voltage Va and the second voltage Vb become the voltage Vs. In the meantime, the second end of the data switch 425 stores a charge amount Qb2 of an equivalent capacitor corresponding to the second sub-pixel unit 420. The charge amount Qb2 can be expressed as Formula (3) listed below.

$$Qb2 = \left[ Clcbv + \frac{Cstbv}{1 + \frac{Cstbv}{Cstcv}} + Cstdv \right] Vs \qquad \text{Formula (3)}$$

In Formula (3), Clcbv, Cstbv, Cstcv, and Cstdv represent the capacitances of the liquid crystal capacitor Clcb and the storage capacitors Cstb, Cstc, Cstd respectively. During the interval T2, the gate signal SGm is switching to low voltage level and the gate signal SGm+1 is switching to high voltage level, therefore the data switches 415, 425 are turned off and the auxiliary switch 430 is turned on. For that reason, the first voltage Va holds the voltage Vs; however, the second voltage Vb is switching to become a voltage Vsy following an occurrence of short-circuit between the first and second ends of the storage capacitor Cstc caused by turning on the auxiliary switch 430. The voltage Vsy can be deduced based on a conservation rule of the charge amount Qb2 and is expressed as Formula (4) listed below.

$$Vsy = \frac{\left[ Clcbv + \frac{Cstbv}{1 + \frac{Cstbv}{Cstcv}} + Cstdv \right]}{(Clcbv + Cstbv + Cstdv)} Vs = \beta Vs \qquad \text{Formula (4)}$$

In Formula (4), $\beta$ is a predetermined proportional constant. After the interval T2, the first sub-pixel unit 410 and the second sub-pixel unit 420 are operative to achieve an MVA wide viewing angle image display based on the first voltage Va and the second voltage Vb having a predetermined proportional relationship. If the electrode areas of the capacitors in the pixel unit 480 are well adjusted, the image quality of the LCD device 400 can be optimized In summary, since the LCD device 400 of the present invention provides different sub-pixel voltages by making use of conventional driving feature corresponding to gate signals of two adjacent gate lines, the number of gate lines required by the LCD device 400 is substantially the same as the number of gate lines required by a conventional LCD device. Therefore, the aperture ratio of each pixel unit in the LCD device 400 is not reduced and the frequency of driving clock used in the LCD device 400 is the same as the frequency of driving clock used in the conventional LCD device. That is, the LCD device 400 is capable of achieving an MVA wide viewing angle image display based on a cost-effective simplified structure. In one embodiment, the LCD device 400 is employed to realize high image display quality having wide viewing angle based on 8-domain vertical alignment design. Besides, the LCD device 400 has no floating electrode and is able to maintain high image display quality during a long-term operation.

Figure 6:
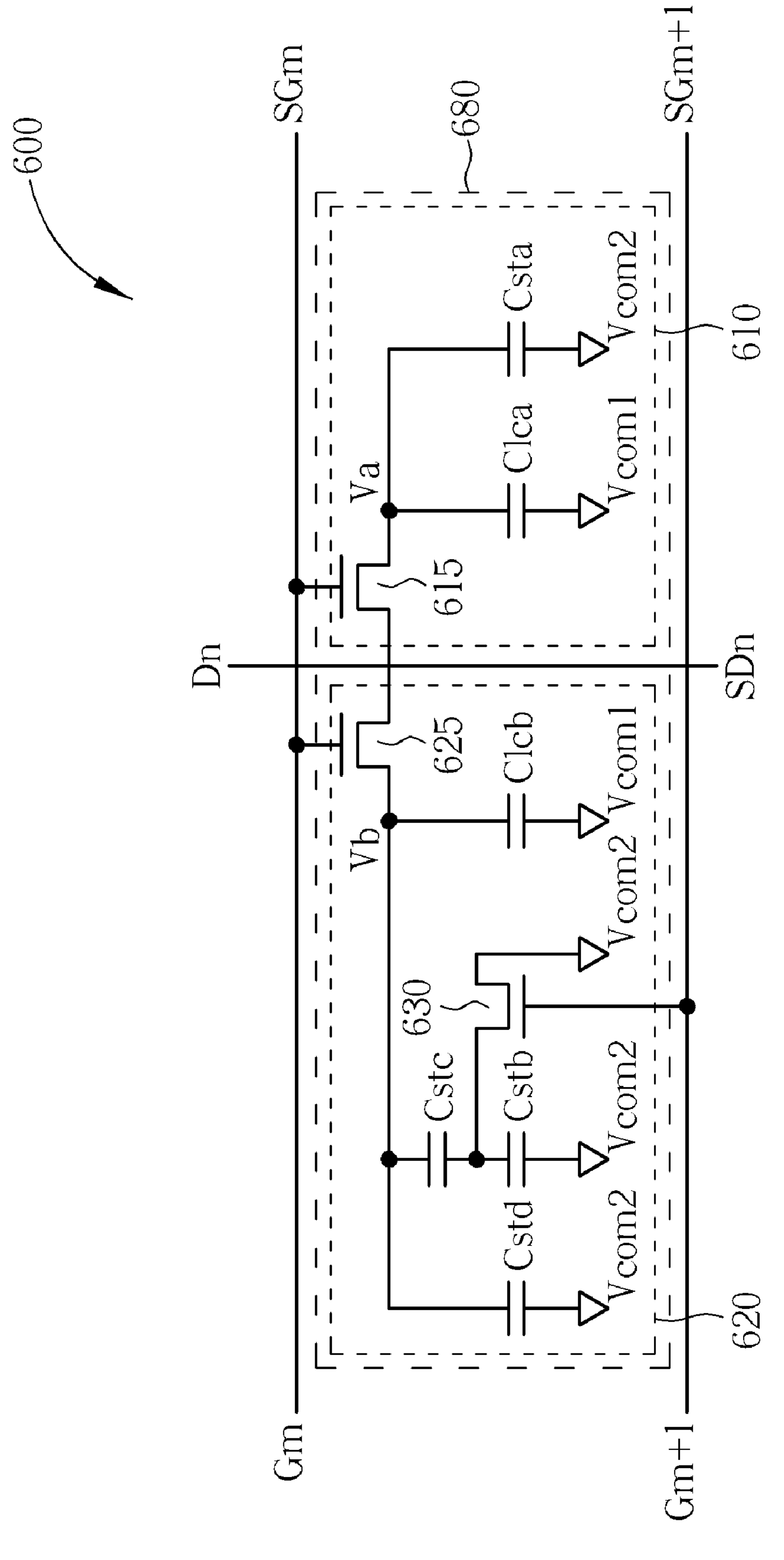
FIG. 6 is a circuit diagram schematically showing an MVA liquid crystal display device in accordance with a third embodiment of the present invention.

FIG. 6 is a circuit diagram schematically showing an MVA liquid crystal display device in accordance with a third embodiment of the present invention. As shown in FIG. 6, the LCD device 600 comprises a pixel unit 680, a data line Dn, a gate line Gm, and a gate line Gm+1. The gate line Gm+1 is adjacent to the gate line Gm. The pixel unit 680 comprises a first sub-pixel unit 610 and a second sub-pixel unit 620. The first sub-pixel unit 610 includes a data switch 615, a liquid crystal capacitor Clca, and a storage capacitor Csta. The second sub-pixel unit 620 includes a data switch 625, an auxiliary switch 630, a liquid crystal capacitor Clcb, a storage capacitor Cstb, a storage capacitor Cstc, and a storage capacitor Cstd. The data switches 615, 625 and the auxiliary switch 630 are thin film transistors or MOS field effect transistors.

The data switch 615 comprises a first end electrically connected to the data line Dn for receiving a data signal SDn, a gate end electrically connected to the gate line Gm for receiving a gate signal SGm, and a second end for outputting a first voltage Va. The liquid crystal capacitor Clca comprises a first end electrically connected to the second end of the data switch 615 and a second end for receiving a first common voltage Vcom1. The storage capacitor Csta comprises a first end electrically connected to the second end of the data switch 615 and a second end for receiving a second common voltage Vcom2. The capacitance of the liquid crystal capacitor Clca is identical to or different from the capacitance of the liquid crystal capacitor Clcb. The capacitances of the storage capacitors Csta, Cstb, Cstc and Cstd are identical or different. The second common voltage Vcom2 is identical to or different from the first common voltage Vcom1.

The data switch 625 comprises a first end electrically connected to the data line Dn for receiving the data signal SDn, a gate end electrically connected to the gate line Gm for receiving the gate signal SGm, and a second end for outputting a second voltage Vb. The liquid crystal capacitor Clcb comprises a first end electrically connected to the second end of the data switch 625 and a second end for receiving the first common voltage Vcom1. The auxiliary switch 630 comprises a first end for receiving the second common voltage Vcom2, a gate end electrically connected to the gate line Gm+1 for receiving a gate signal SGm+1, and a second end. The storage capacitor Cstb comprises a first end electrically connected to the second end of the auxiliary switch 630 and a second end for receiving the second common voltage Vcom2. The storage capacitor Cstc comprises a first end electrically connected to the second end of the data switch 625 and a second end electrically connected to the second end of the auxiliary switch 630. The storage capacitor Cstd comprises a first end electrically connected to the second end of the data switch 625 and a second end for receiving the second common voltage Vcom2.

Figure 7:
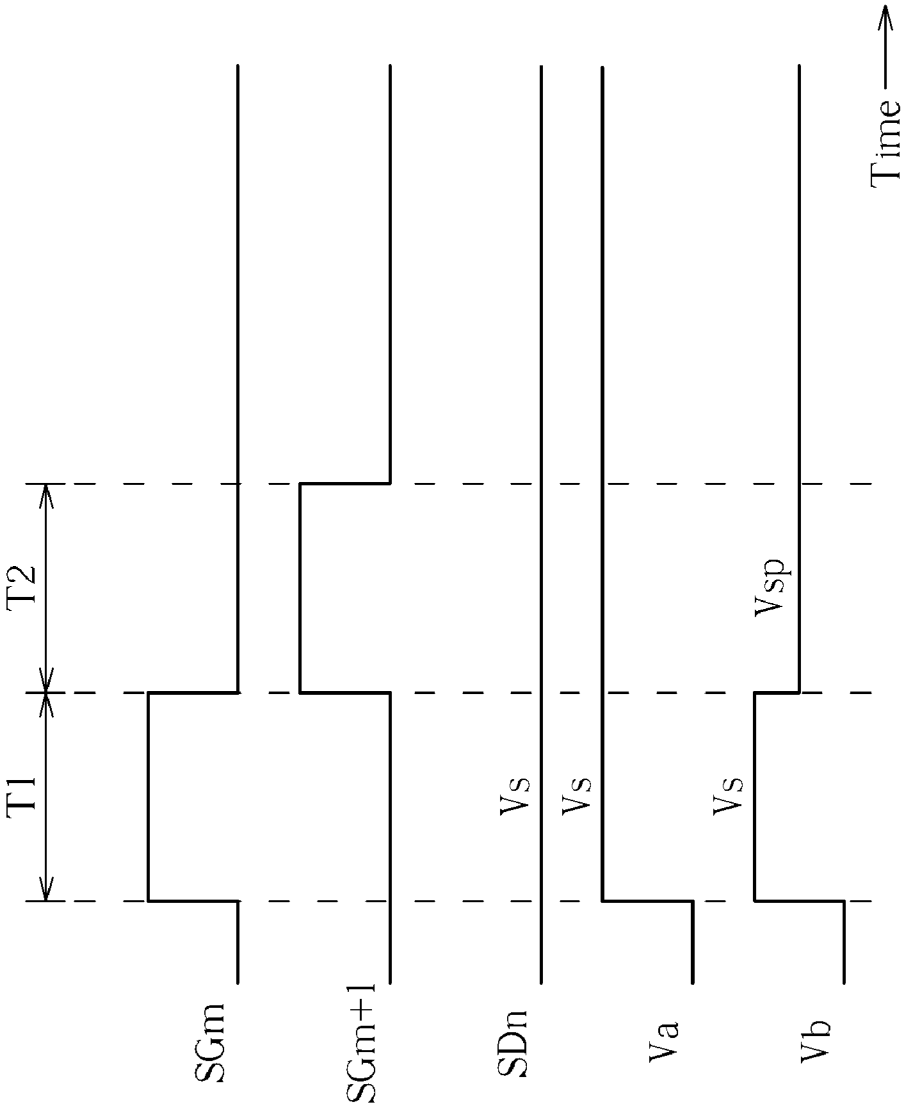
FIG. 7 shows related signal waveforms regarding operations of the LCD device in FIG. 6, having time along the abscissa.

FIG. 7 shows related signal waveforms regarding operations of the LCD device 600 in FIG. 6, having time along the abscissa. The signal waveforms in FIG. 7, from top to bottom, are the gate signal SGm, the gate signal SGm+1, the data signal SDn, the first voltage Va, and the second voltage Vb. The data signal SDn is assumed to retain a voltage Vs in a short time including intervals T1 and T2. As shown in FIG. 7, the gate signal SGm has high voltage level and the gate signal SGm+1 has low voltage level during the interval T1, therefore the data switches 615, 625 are turned on and the auxiliary switch 630 is turned off. Accordingly, both the first voltage Va and the second voltage Vb become the voltage Vs. In the meantime, the equivalent capacitor of the second sub-pixel unit 620 stores a charge amount Qb3 at the second end of the data switch 625. The charge amount Qb3 can be expressed as Formula (5) listed below.

$$Qb3 = \left[Clcbv + \frac{Cstcv}{1 + \frac{Cstcv}{Cstbv}} + Cstdv\right]Vs \quad \text{Formula (5)}$$

In Formula (5), Clcbv, Cstbv, Cstcv, and Cstdv represent the capacitances of the liquid crystal capacitor Clcb and the storage capacitors Cstb, Cstc, Cstd respectively. During the interval T2, the gate signal SGm is switching to low voltage level and the gate signal SGm+1 is switching to high voltage level, therefore the data switches 615, 625 are turned off and the auxiliary switch 630 is turned on. For that reason, the first voltage Va holds the voltage Vs; however, the second voltage Vb is switching to become a voltage Vsp following an occurrence of short-circuit between the first and second ends of the storage capacitor Cstb caused by turning on the auxiliary switch 630. The voltage Vsp can be deduced based on a conservation rule of the charge amount Qb3 and is expressed as Formula (6) listed below.

$$Vsp = \frac{\left[Clcbv + \frac{Cstcv}{1 + \frac{Cstcv}{Cstbv}} + Cstdv\right]}{(Clcbv + Cstcv + Cstdv)} Vs = \gamma Vs \quad \text{Formula (6)}$$

In Formula (6), γ is a predetermined proportional constant. After the interval T2, the first sub-pixel unit 610 and the second sub-pixel unit 620 are operative to achieve an MVA wide viewing angle image display based on the first voltage Va and the second voltage Vb having a predetermined proportional relationship. If the electrode areas of the capacitors in the pixel unit 680 are well adjusted, the image quality of the LCD device 600 can be optimized In summary, since the LCD device 600 of the present invention provides different sub-pixel voltages by making use of conventional driving feature corresponding to gate signals of two adjacent gate lines, the number of gate lines required by the LCD device 600 is substantially the same as the number of gate lines required by a conventional LCD device. Therefore, the aperture ratio of each pixel unit in the LCD device 600 is not reduced and the frequency of driving clock used in the LCD device 600 is the same as the frequency of driving clock used in the conventional LCD device. That is, the LCD device 600 is capable of achieving an MVA wide viewing angle image display based on a cost-effective simplified structure. In one embodiment, the LCD device 600 is employed to realize high image display quality having wide viewing angle based on 8-domain vertical alignment design. Besides, the LCD device 600 has no floating electrode and is able to maintain high image display quality during a long-term operation.

Figure 8:
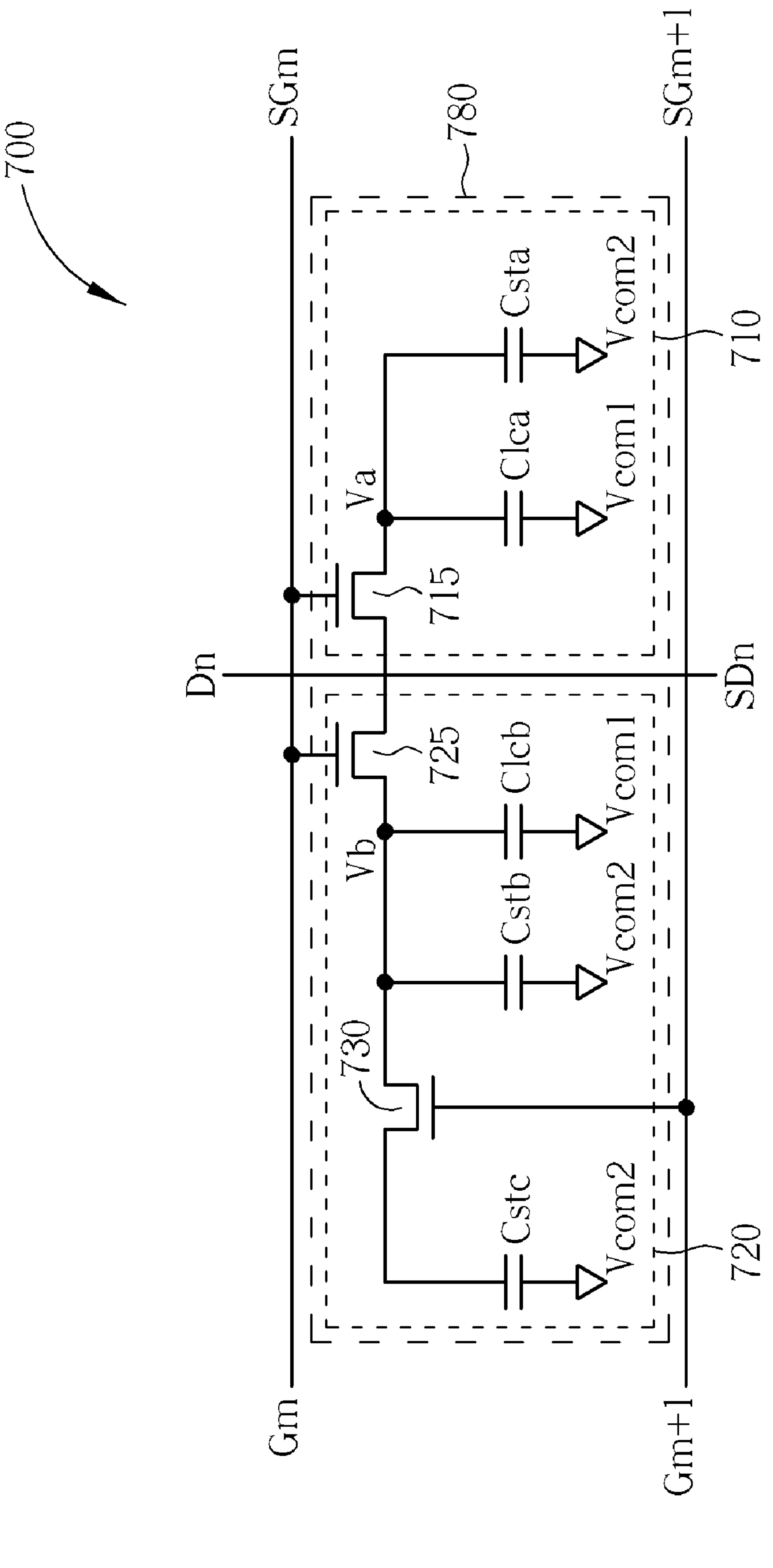
FIG. 8 is a circuit diagram schematically showing an MVA liquid crystal display device in accordance with a fourth embodiment of the present invention.

FIG. 8 is a circuit diagram schematically showing an MVA liquid crystal display device in accordance with a fourth embodiment of the present invention. As shown in FIG. 8, the LCD device 700 comprises a pixel unit 780, a data line Dn, a gate line Gm, and a gate line Gm+1. The gate line Gm+1 is adjacent to the gate line Gm. The pixel unit 780 comprises a first sub-pixel unit 710 and a second sub-pixel unit 720. The first sub-pixel unit 710 includes a data switch 715, a liquid crystal capacitor Clca, and a storage capacitor Csta. The second sub-pixel unit 720 includes a data switch 725, an auxiliary switch 730, a liquid crystal capacitor Clcb, a storage capacitor Cstb, and a storage capacitor Cstc. The data switches 715, 725 and the auxiliary switch 730 are thin film transistors or MOS field effect transistors.

The data switch 715 comprises a first end electrically connected to the data line Dn for receiving a data signal SDn, a gate end electrically connected to the gate line Gm for receiving a gate signal SGm, and a second end for outputting a first voltage Va. The liquid crystal capacitor Clca comprises a first end electrically connected to the second end of the data switch 715 and a second end for receiving a first common voltage Vcom1. The storage capacitor Csta comprises a first end electrically connected to the second end of the data switch 715 and a second end for receiving a second common voltage Vcom2. The capacitance of the liquid crystal capacitor Clca is identical to or different from the capacitance of the liquid crystal capacitor Clcb. The capacitances of the storage capacitors Csta, Cstb and Cstc are identical or different. The second common voltage Vcom2 is identical to or different from the first common voltage Vcom1.

The data switch 725 comprises a first end electrically connected to the data line Dn for receiving the data signal SDn, a gate end electrically connected to the gate line Gm for receiving the gate signal SGm, and a second end for outputting a second voltage Vb. The liquid crystal capacitor Clcb comprises a first end electrically connected to the second end of the data switch 725 and a second end for receiving the first common voltage Vcom1. The storage capacitor Cstb comprises a first end electrically connected to the second end of the data switch 725 and a second end for receiving the second common voltage Vcom2. The auxiliary switch 730 comprises a first end electrically connected to the second end of the data switch 725, a gate end electrically connected to the gate line Gm+1 for receiving a gate signal SGm+1, and a second end. The storage capacitor Cstc comprises a first end electrically connected to the second end of the auxiliary switch 730 and a second end for receiving the second common voltage Vcom2.

Figure 9:
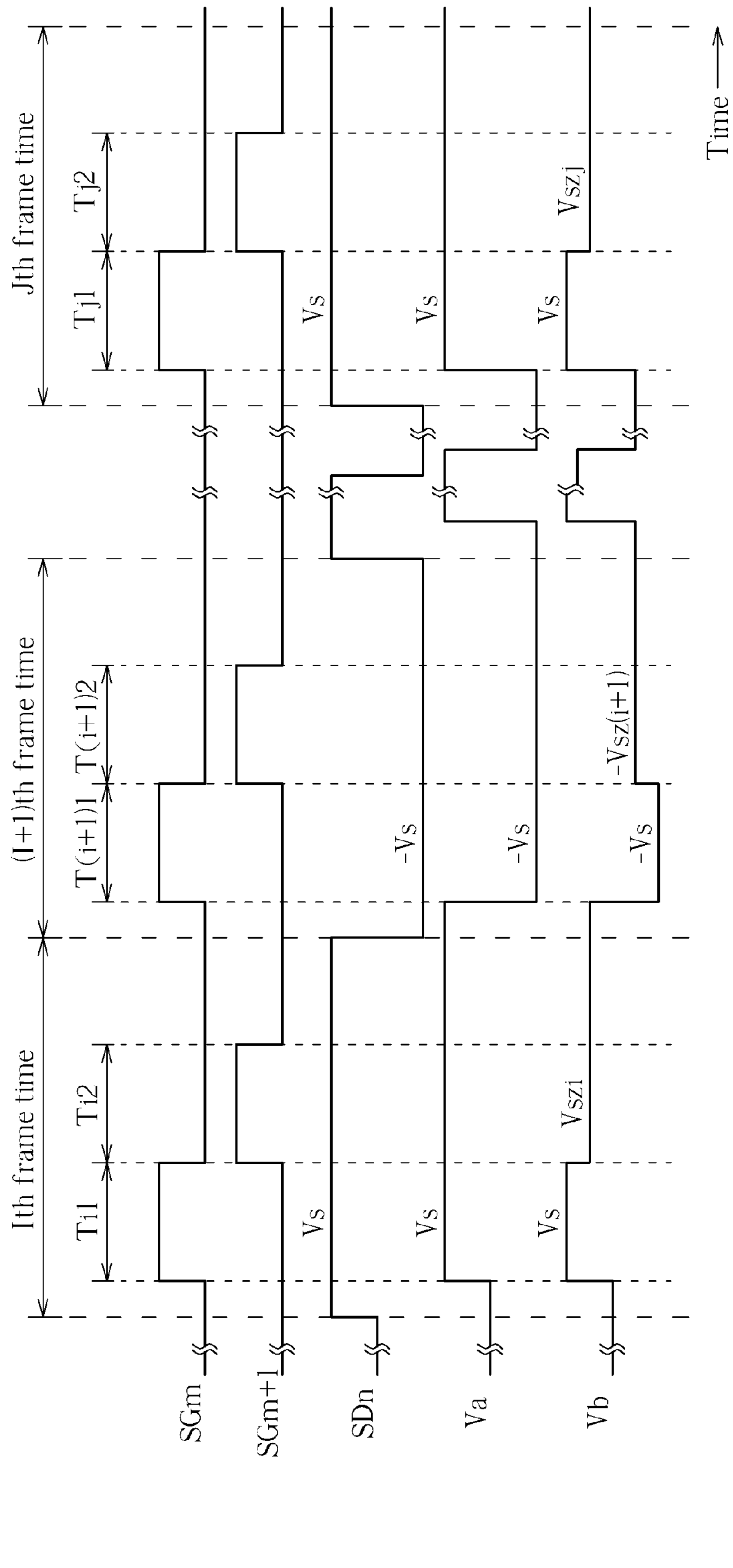
FIG. 9 shows related signal waveforms regarding operations of the LCD device in FIG. 8, having time along the abscissa.

FIG. 9 shows related signal waveforms regarding operations of the LCD device 700 in FIG. 8, having time along the abscissa. The signal waveforms in FIG. 9, from top to bottom, are the gate signal SGm, the gate signal SGm+1, the data signal SDn, the first voltage Va, and the second voltage Vb. The data signal SDn is assumed to hold a voltage Vs or −Vs in a short time including an Ith frame time, a (I+1)th frame time through a Jth frame time. For instance, the data signal SDn holds a voltage Vs during the Ith frame time; the data signal SDn holds a voltage −Vs during the (I+1) th frame time; and the data signal SDn holds a voltage Vs during the Jth frame time. As shown in FIG. 9, the gate signal SGm has high voltage level and the gate signal SGm+1 has low voltage level during an interval Ti1 of the Ith frame time, therefore the data switches 715, 725 are turned on and the auxiliary switch 730 is turned off. Accordingly, both the first voltage Va and the second voltage Vb become the voltage Vs. In the meantime, the second end of the data switch 725 stores a charge amount Qb4 of an equivalent capacitor corresponding to the liquid crystal capacitor Clcb and the storage capacitor Cstb connected in parallel. The charge amount Qb4 can be expressed as Formula (7) listed below.

$$Qb4=[Clcbv+Cstb]Vs \quad \text{Formula (7)}$$

In Formula (7), Clcbv and Cstbv represent the capacitances of the liquid crystal capacitor Clcb and the storage capacitors Cstb respectively. During an interval Ti2 of the Ith frame time, the gate signal SGm is switching to low voltage level and the gate signal SGm+1 is switching to high voltage level, therefore the data switches 715, 725 are turned off and the auxiliary switch 730 is turned on. For that reason, the first voltage Va holds the voltage Vs; however, the second voltage Vb is switching to become a voltage Vszi because of turning on the auxiliary switch 730. The voltage Vszi can be deduced based on a conservation rule of the charge amount Qb4 and is expressed as Formula (8) listed below.

$$Vszi=\frac{(Clcbv+Cstbv)}{(Clcbv+Cstbv+Cstcv)}Vs \quad \text{Formula (8)}$$

In Formula (8), Cstcv represents the capacitance of the storage capacitors Cstc. At this time, the first end of the storage capacitors Cstc stores a charge amount Qc1. The charge amount Qc1 can be expressed as Formula (9) listed below.

$$Qc1=Vszi\times Cstcv=\frac{(Clcbv+Cstbv)Cstcv}{(Clcbv+Cstbv+Cstcv)}Vs \quad \text{Formula (9)}$$

During an interval T(i+1)1 of the (I+1)th frame time, the gate signal SGm has high voltage level and the gate signal SGm+1 has low voltage level, therefore the data switches 715, 725 are turned on and the auxiliary switch 730 is turned off. Accordingly, both the first voltage Va and the second voltage Vb become the voltage −Vs. In the meantime, the second end of the data switch 725 stores a charge amount −Qb4 of the equivalent capacitor corresponding to the liquid crystal capacitor Clcb and the storage capacitor Cstb connected in parallel.

During an interval T(i+1)2 of the (I+1)th frame time, the gate signal SGm is switching to low voltage level and the gate signal SGm+1 is switching to high voltage level, therefore the data switches 715, 725 are turned off and the auxiliary switch 730 is turned on. For that reason, the first voltage Va holds the voltage −Vs; however, the second voltage Vb is switching to become a voltage −Vsz(i+1) because of turning on the auxiliary switch 730. The voltage Vsz(i+1) can be deduced based on a conservation rule of the charge amount (Qb4−Qc1) and is expressed as Formula (10) listed below.

$$Vsz(i+1)=\frac{(Clcbv+Cstbv)}{(Clcbv+Cstbv+Cstcv)}\left[1-\frac{Cstcv}{Clcbv+Cstbv+Cstcv}\right]Vs \quad \text{Formula (10)}$$

When the second voltage Vb reaches steady state at the Jth frame time after several frame times subsequent to the (I+1)th frame time, the second voltage Vb becomes a voltage Vszj. Based on the aforementioned Formula (7) through Formula (10), the voltage Vszj can be deduced and is expressed as Formula (11) listed below.

$$\begin{aligned}Vszj &= \frac{Clcbv+Cstbv}{Clcbv+Cstbv+Cstcv}\left[1-\frac{Cstcv}{Clcbv+Cstbv+Cstcv}+\left(\frac{Cstcv}{Clcbv+Cstbv+Cstcv}\right)^2-\ldots\right]Vs \\ &= \frac{(Clcbv+Cstbv)}{(Clcbv+Cstbv+2Cstcv)}Vs \\ &= \lambda Vs\end{aligned} \quad \text{Formula (11)}$$

In Formula (11), λ is a predetermined proportional constant. After the interval Tj2, the first sub-pixel unit 710 and the second sub-pixel unit 720 are operative to achieve an MVA wide viewing angle image display based on the first voltage Va and the second voltage Vb having a predetermined proportional relationship. In the operation of the LCD device 700, the second voltage Vb may be sort of unstable under high frame variation rate. However, under general operation situation, an occurrence of serious image flickering phenomena can be avoided and the LCD device 700 is still able to maintain high display quality.

In summary, since the LCD device 700 of the present invention provides different sub-pixel voltages by making use of conventional driving feature corresponding to gate signals of two adjacent gate lines, the number of gate lines required by the LCD device 700 is substantially the same as the number of gate lines required by a conventional LCD device. Therefore, the aperture ratio of each pixel unit in the LCD device 700 is not reduced and the frequency of driving clock used in the LCD device 700 is the same as the frequency of driving clock used in the conventional LCD device. That is, the LCD device 700 is capable of achieving an MVA wide viewing angle image display based on a cost-effective simplified structure. In one embodiment, the LCD device 700 is employed to realize high image display quality having wide viewing angle based on 8-domain vertical alignment design. Besides, the LCD device 700 has no floating electrode and is able to maintain high image display quality during a long-term operation.

Figure 10:
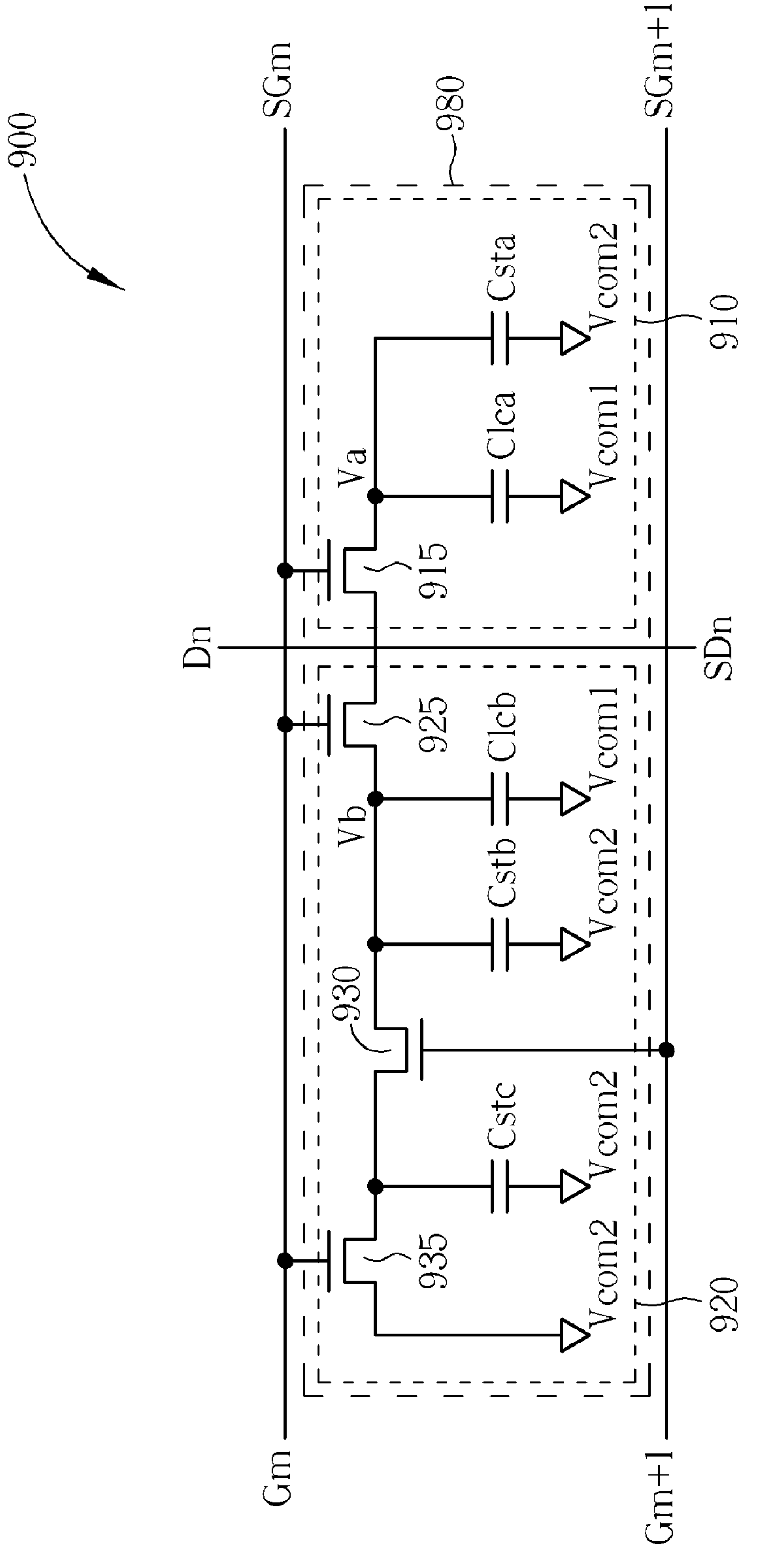
FIG. 10 is a circuit diagram schematically showing an MVA liquid crystal display device in accordance with a fifth embodiment of the present invention.

FIG. 10 is a circuit diagram schematically showing an MVA liquid crystal display device in accordance with a fifth embodiment of the present invention. As shown in FIG. 10, the LCD device 900 comprises a pixel unit 980, a data line Dn, a gate line Gm, and a gate line Gm+1. The gate line Gm+1 is adjacent to the gate line Gm. The pixel unit 980 comprises a first sub-pixel unit 910 and a second sub-pixel unit 920. The first sub-pixel unit 910 includes a data switch 915, a liquid crystal capacitor Clca, and a storage capacitor Csta. The second sub-pixel unit 920 includes a data switch 925, an auxiliary switch 930, an auxiliary switch 935, a liquid crystal capacitor Clcb, a storage capacitor Cstb, and a storage capacitor Cstc. The data switches 915, 925 and the auxiliary switches 930, 935 are thin film transistors or MOS field effect transistors.

The data switch 915 comprises a first end electrically connected to the data line Dn for receiving a data signal SDn, a gate end electrically connected to the gate line Gm for receiving a gate signal SGm, and a second end for outputting a first voltage Va. The liquid crystal capacitor Clca comprises a first end electrically connected to the second end of the data switch 915 and a second end for receiving a first common voltage Vcom1. The storage capacitor Csta comprises a first end electrically connected to the second end of the data switch 915 and a second end for receiving a second common voltage Vcom2. The capacitance of the liquid crystal capacitor Clca is identical to or different from the capacitance of the liquid crystal capacitor Clcb. The capacitances of the storage capacitors Csta, Cstb and Cstc are identical or different. The second common voltage Vcom2 is identical to or different from the first common voltage Vcom1.

The data switch 925 comprises a first end electrically connected to the data line Dn for receiving the data signal SDn, a gate end electrically connected to the gate line Gm for receiving the gate signal SGm, and a second end for outputting a second voltage Vb. The liquid crystal capacitor Clcb comprises a first end electrically connected to the second end of the data switch 925 and a second end for receiving the first common voltage Vcom1. The storage capacitor Cstb comprises a first end electrically connected to the second end of the data switch 925 and a second end for receiving the second common voltage Vcom2. The auxiliary switch 930 comprises a first end electrically connected to the second end of the data switch 925, a gate end electrically connected to the gate line Gm+1 for receiving a gate signal SGm+1, and a second end. The storage capacitor Cstc comprises a first end electrically connected to the second end of the auxiliary switch 930 and a second end for receiving the second common voltage Vcom2. The auxiliary switch 935 comprises a first end electrically connected to the first end of the storage capacitor Cstc, a gate end electrically connected to the gate line Gm for receiving the gate signal SGm, and a second end for receiving the second common voltage Vcom2.

Figure 11:
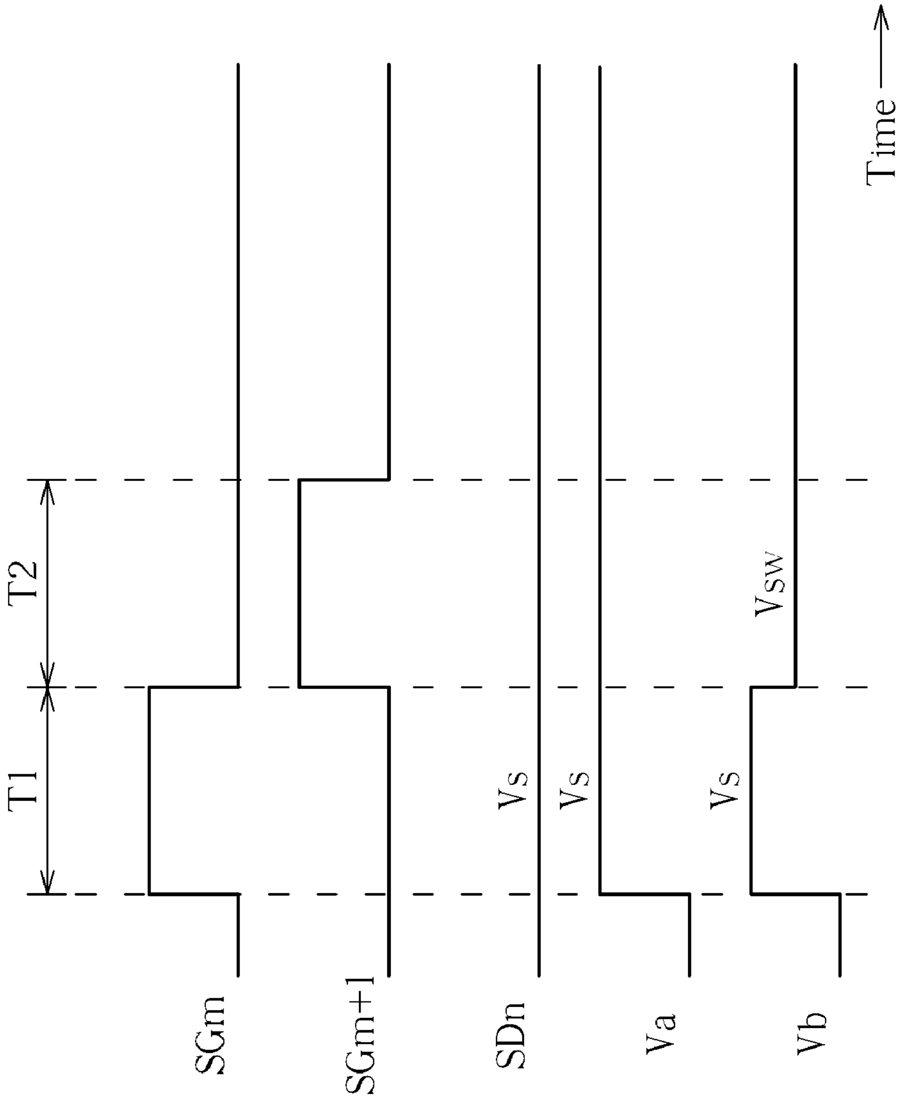
FIG. 11 shows related signal waveforms regarding operations of the LCD device in FIG. 10, having time along the abscissa.

FIG. 11 shows related signal waveforms regarding operations of the LCD device 900 in FIG. 10, having time along the abscissa. The signal waveforms in FIG. 11, from top to bottom, are the gate signal SGm, the gate signal SGm+1, the data signal SDn, the first voltage Va, and the second voltage Vb. The data signal SDn is assumed to retain a voltage Vs in a short time including intervals T1 and T2. As shown in FIG. 11, the gate signal SGm has high voltage level and the gate signal SGm+1 has low voltage level during the interval T1, therefore the data switches 915, 925 and the auxiliary switch 935 are turned on and the auxiliary switch 930 is turned off. Accordingly, both the first voltage Va and the second voltage Vb become the voltage Vs, and the electric charges accumulated in the storage capacitor Cstc can be released via the auxiliary switch 935. In the meantime, the second end of the data switch 925 stores a charge amount Qb5 of the equivalent capacitor corresponding to the liquid crystal capacitor Clcb and the storage capacitor Cstb connected in parallel. The charge amount Qb5 can be expressed as Formula (12) listed below.

$$Qb5=[Clcbv+Cstbv]Vs \quad \text{Formula (12)}$$

In Formula (12), Clcbv and Cstbv represent the capacitances of the liquid crystal capacitor Clcb and the storage capacitor Cstb respectively. During the interval T2, the gate signal SGm is switching to low voltage level and the gate signal SGm+1 is switching to high voltage level, therefore the data switches 915, 925 and the auxiliary switch 935 are turned off and the auxiliary switch 930 is turned on. For that reason, the first voltage Va holds the voltage Vs; however, the second voltage Vb is switching to become a voltage Vsw because of turning on the auxiliary switch 930. The voltage Vsw can be deduced based on a conservation rule of the charge amount Qb5 and is expressed as Formula (13) listed below.

$$Vsw=\frac{(Clcbv+Cstbv)}{(Clcbv+Cstbv+Cstcv)}Vs=\sigma Vs \quad \text{Formula (13)}$$

In Formula (13), Cstcv represent the capacitance of the storage capacitor Cstc and σ is a predetermined proportional constant. After the interval T2, the first sub-pixel unit 910 and the second sub-pixel unit 920 are operative to achieve an MVA wide viewing angle image display based on the first voltage Va and the second voltage Vb having a predetermined proportional relationship. If the electrode areas of the capacitors in the pixel unit 980 are well adjusted, the image quality of the LCD device 900 can be optimized In summary, since the LCD device 900 of the present invention provides different sub-pixel voltages by making use of conventional driving feature corresponding to gate signals of two adjacent gate lines, the number of gate lines required by the LCD device 900 is substantially the same as the number of gate lines required by a conventional LCD device. Therefore, the aperture ratio of each pixel unit in the LCD device 900 is not reduced and the frequency of driving clock used in the LCD device 900 is the same as the frequency of driving clock used in the conventional LCD device. That is, the LCD device 900 is capable of achieving an MVA wide viewing angle image display based on a cost-effective simplified structure. In one embodiment, the LCD device 900 is employed to realize high image display quality having wide viewing angle based on 8-domain vertical alignment design. Besides, the LCD device 900 has no floating electrode and is able to maintain high image display quality during a long-term operation.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display device comprising:
a data line for delivering a data signal;
a first gate line for delivering a first gate signal;
a second gate line for delivering a second gate signal;
a first sub-pixel unit comprising:
 a first data switch comprising:
  a first end electrically connected to the data line for receiving the data signal;
  a gate end electrically connected to the first gate line for receiving the first gate signal; and
  a second end;
 a first liquid crystal capacitor comprising:
  a first end electrically connected to the second end of the first data switch; and
  a second end for receiving a first common voltage; and
 a first storage capacitor comprising:
  a first end electrically connected to the second end of the first data switch; and
  a second end for receiving a second common voltage; and a second sub-pixel unit comprising:
a second data switch comprising:
a first end electrically connected to the data line for receiving the data signal;
a gate end electrically connected to the first gate line for receiving the first gate signal; and
a second end;
a second liquid crystal capacitor comprising:
a first end electrically connected to the second end of the second data switch; and
a second end for receiving the first common voltage;
an auxiliary switch comprising:
a first end electrically connected to the second end of the second data switch;
a gate end electrically connected to the second gate line for receiving the second gate signal; and
a second end;
a second storage capacitor comprising:
a first end directly connected to the second end of the auxiliary switch; and
a second end for receiving the second common voltage; and
a third storage capacitor comprising:
a first end electrically connected to the second end of the second data switch; and
a second end electrically connected to the second end of the auxiliary switch.

2. The liquid crystal display device of claim 1, wherein the second gate line is adjacent to the first gate line.

3. The liquid crystal display device of claim 1, wherein the first data switch and the second data switch are thin film transistors or metal oxide semiconductor (MOS) field effect transistors.

4. The liquid crystal display device of claim 1, wherein the auxiliary switch is a thin film transistor or a MOS field effect transistor.

5. The liquid crystal display device of claim 1, wherein the first sub-pixel unit and the second sub-pixel unit belong to a pixel unit.

6. The liquid crystal display device of claim 1, wherein the second sub-pixel unit further comprises:
a fourth storage capacitor comprising:
a first end electrically connected to the second end of the second data switch; and
a second end for receiving the second common voltage.

7. The liquid crystal display device of claim 1, wherein second common voltage is identical to or different from the first common voltage.

8. A liquid crystal display device comprising:
a data line for delivering a data signal;
a first gate line for delivering a first gate signal;
a second gate line for delivering a second gate signal;
a first sub-pixel unit comprising:
a first data switch comprising:
a first end electrically connected to the data line for receiving the data signal;
a gate end electrically connected to the first gate line for receiving the first gate signal; and
a second end;

a first liquid crystal capacitor comprising:
a first end electrically connected to the second end of the first data switch; and
a second end for receiving a first common voltage; and
a first storage capacitor comprising:
a first end electrically connected to the second end of the first data switch; and
a second end for receiving a second common voltage; and
a second sub-pixel unit comprising:
a second data switch comprising:
a first end electrically connected to the data line for receiving the data signal;
a gate end electrically connected to the first gate line for receiving the first gate signal; and
a second end;
a second liquid crystal capacitor comprising:
a first end electrically connected to the second end of the second data switch; and
a second end for receiving the first common voltage;
an auxiliary switch comprising:
a first end for receiving the second common voltage;
a gate end electrically connected to the second gate line for receiving the second gate signal; and
a second end;
a second storage capacitor comprising:
a first end directly connected to the second end of the auxiliary switch; and
a second end for receiving the second common voltage;
a third storage capacitor comprising:
a first end directly connected to the second end of the second data switch; and
a second end electrically connected to the second end of the auxiliary switch; and
a fourth storage capacitor comprising:
a first end directly connected to the second end of the second data switch; and
a second end for receiving the second common voltage.

9. The liquid crystal display device of claim 8, wherein the second gate line is adjacent to the first gate line.

10. The liquid crystal display device of claim 8, wherein the first data switch and the second data switch are thin film transistors or MOS field effect transistors.

11. The liquid crystal display device of claim 8, wherein the auxiliary switch is a thin film transistor or a MOS field effect transistor.

12. The liquid crystal display device of claim 8, wherein second common voltage is identical to or different from the first common voltage.

13. The liquid crystal display device of claim 8, wherein the first sub-pixel unit and the second sub-pixel unit belong to a pixel unit.

* * * * *